United States Patent [19]

Tahara

[11] Patent Number: 5,281,318

[45] Date of Patent: Jan. 25, 1994

[54] PROCESS FOR PROCESSING A WASTE ETCHING SOLUTION CONTAINING A FLUORINE COMPONENT AND AN AMMONIA COMPONENT TO RECOVER VALUABLES THEREFROM

[75] Inventor: Hiroshi Tahara, Kawasaki, Japan

[73] Assignee: Tomen Construction Co., Ltd., Tokyo, Japan

[21] Appl. No.: 918,706

[22] Filed: Jul. 27, 1992

[30] Foreign Application Priority Data

Jul. 26, 1991 [JP] Japan .................................. 3-208932

[51] Int. Cl.$^5$ .............................................. C25B 1/22
[52] U.S. Cl. .............................. 204/182.4; 204/182.3; 423/356; 423/490
[58] Field of Search ................ 423/483, 356, 490; 204/182.3, 182.4

[56] References Cited

U.S. PATENT DOCUMENTS 4,713,231 12/1987 Campbell et al. .................. 423/356

FOREIGN PATENT DOCUMENTS 829605 3/1960 United Kingdom ................ 423/483
2080274 2/1982 United Kingdom ................ 423/356

Primary Examiner—Wayne Langel
Attorney, Agent, or Firm—Wenderoth, Lind & Ponack

[57] ABSTRACT

A process for recovering valuables from a waste etching solution containing a fluorine component and ammonia component is provided comprising recovering respectively a fluorine component and ammonia component in the waste solution and recovering a potassium and/or sodium component used for processing the waste solution, and utilizing respectively the recovered components for preparation of an etching solution or reusing or recycling for processing the waste solution. That is, this process comprises adding at least one of potassium hydroxide and sodium hydroxide to the waste etching solution containing a fluorine component and an ammonia component to form hydroxides of metal ions dissolved in the waste solution, filtering the neutralized solution for separation of the metal hydroxides, heating the filtrate by steam injection to recover the generated ammonia as ammonia gas, aqueous ammonia or liquid ammonia, then subjecting the aqueous solution (KF and/or NaF solution free from ammonia components) after recovering the ammonia component to processing using a monopolar or bipolar membrane to recover the fluorine component as an aqueous hydrofluoric acid solution, further recovering at least one of the potassium component and sodium component as at least one of potassium hydroxide and sodium hydroxide and recycling and reusing the recovered ammonia and recovered aqueous hydrofluoric acid solution for the preparation of a new etching solution and at least one of the recovered potassium hydroxide and sodium hydroxide for processing the waste etching solution as a neutralizing agent.

6 Claims, 2 Drawing Sheets

PROCESS FOR PROCESSING A WASTE ETCHING SOLUTION CONTAINING A FLUORINE COMPONENT AND AN AMMONIA COMPONENT TO RECOVER VALUABLES THEREFROM

BACKGROUND OF THE INVENTION

1. Field of the Invention

This invention relates to a process for recovering valuables from a waste etching solution containing a fluorine component and ammonia component and in particular, it is concerned with a process for recovering valuables from a waste etching solution containing a fluorine component and ammonia component, comprising recovering respectively a fluorine component and ammonia component in the waste solution and recovering a sodium component and/or potassium component used for processing the waste solution, and utilizing respectively the recovered components for preparation of a new etching solution or reusing or recycling for processing the waste solution.

2. Description of the Prior Art

As to waste etching solutions containing fluorine components and ammonia components discarded from the semiconductor and LSI industries, any effective processes for recovering valuables from the etching solutions have not been developed up to the present time, since it is considered hard to recover fluorine and ammonia as valuable components from the waste solutions.

As described above, any effective means for recovering valuable materials from an etching solution containing a fluorine component and ammonia component has not been developed, but an expedient processing means has been proposed.

The expedient processing means is generally carried out by a neutralization method with a low processing cost, in which slaked lime or cheap carbide sludge is used as a neutralizing agent.

In this neutralization method, only the fluorine component in the waste solution is fixed as $CaF_2$ and subjected to abandonment, as a sludge with excess slaked lime, for reclamation. On the other hand, the ammonium component dissolved in the waste solution is diluted as it is and discharged. This ammonia component has been considered to nourish, as a nitrogen component, lakes, marshes and seas, and to cause red tide.

The amount of waste etching solutions containing fluorine components and ammonia components has been increased with the development of the semiconductor and LSI industries. Unless a technical development is made in the recovering process, therefore, it is supposed that serious problems arise such as increase of abandonment of sludges, discharge of nitrogen components, environmental pollutions, etc.

A technique for recovering valuable components from an etching solution containing a fluorine component and an ammonia component has also been proposed, but the recovered components are not used for resource-recycling. For example, Japanese Patent Publication No. 5366/1972 discloses a process for the production of ammonium hydrogen fluoride from ammonium fluoride, in which a low concentration aqueous solution of ammonium fluoride is heated at 50° to 130° C. under a pressure of at most 700 mmHg while maintaining a water content of 5 to 30 weight % and the thus generated steam and ammonia are removed, thereby obtaining an anhydrous crystal mixture of at least about 90 weight % of ammonium hydrogen fluoride and at most about 10 weight % of ammonium fluoride.

In this production process, the recovered valuable substance is the mixture of ammonium hydrogen fluoride and ammonium fluoride and has difficulty in handling, since in particular, ammonium fluoride is so thermally unstable that ammonia gas is released at a temperature of at least 40° C. to form ammonium hydrogen fluoride and ammonium fluoride is more deliquescent than ammonium hydrogen fluoride.

Furthermore, this production process has the disadvantage that ammonia gas is generated with steam and due to the generation of ammonia gas, it is hard to treat the condensed water.

Japanese Patent Laid-Open Publication No. 265514/1991 discloses a process for processing a waste etching solution containing fluorine compound, comprising adding hydrofluoric acid and/or ammonia to the waste etching solution and forming an ammonium hydrogen fluoride solution, followed by recovering ammonium hydrogen fluoride as a crystal. However, this process has also a problem on effective recyling in a closed system.

As described above, any effective process for recovering valuables from an etching solution containing a fluorine component and ammonia component has not hitherto been developed and consequently, a serious problem on environmental pollution has been occurring with development of the semiconductor and LSI industries. Even if recovered, the recovered substance is only used as a component far from for resources-recycling.

SUMMARY OF THE INVENTION

The inventors have made various studies on effective means for processing the above described waste etching solution to recover valuables therefrom and thus have accomplished the present invention.

It is an object of the present invention to provide a process for recovering valuables from a waste etching solution containing a fluorine component and an ammonia component, whereby the disadvantages and problems of the prior art can be solved.

It is another object of the present invention to provide a process for processing an waste etching solution to recover valuables therefrom, which is capable of effectively processing the etching solution containing a fluorine component and an ammonia component, thus recovering individually the ammonia component as aqueous ammonia, ammonia gas or liquid ammonia, the fluorine component as aqueous hydrofluoric acid or high purity aqueous hydrofluoric acid and a potassium and/or sodium component as a high concentration aqueous hydroxide solution and reusing or recycling these materials as raw materials of the etching solution or applying these materials to other industries.

These objects can be attained by a process for recovering valuables from a waste etching solution containing a fluorine component and an ammonia component, which comprises adding at least one of potassium hydroxide and sodium hydroxide to the waste etching solution containing a fluorine component and an ammonia component to form hydroxides of metal ions dissolved in the waste solution, filtering the solution and heating the filtrate by steam to recover the generated ammonia as ammonia gas, aqueous ammonia or liquid ammonia.

BRIEF DESCRIPTION OF THE DRAWINGS

The accompanying drawings are to illustrate the principle and the merits of the present invention in detail.

DETAILED DESCRIPTION OF THE INVENTION

Figure 1:
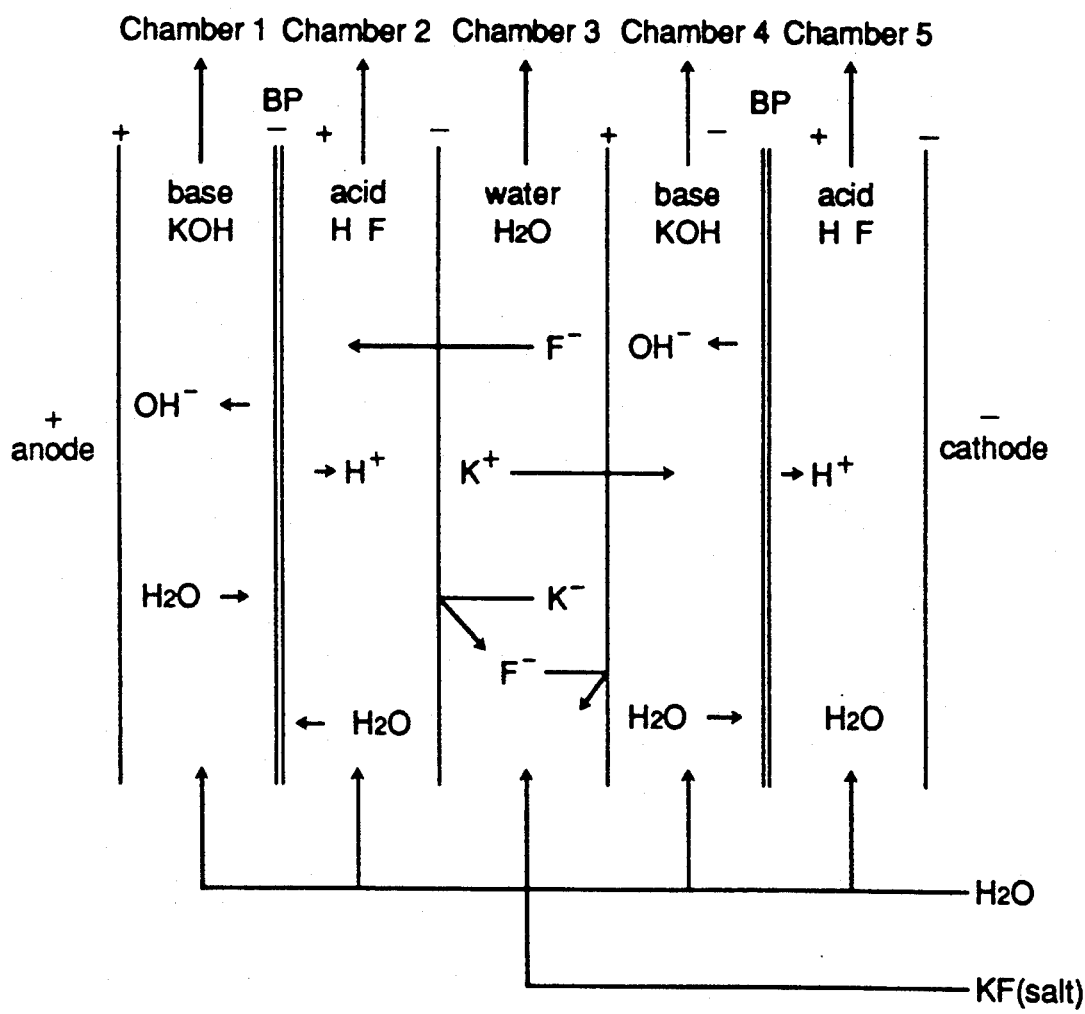
FIG. 1 is a schematic view of showing the principle of a process for processing a waste etching solution to recover valuables therefrom utilizing a bipolar membrane (BP) according to the present invention.

The features of the present invention consist in:

(1) firstly adding an alkali solution (potassium hydroxide and/or sodium hydroxide) to a waste etching solution containing a fluorine component and an ammonia component to remove dissolved metal ions in the waste etching solution as the metal hydroxides, (2) then steam-heating the solution to evaporate or gasify $NH_3$ and recovering the $NH_3$ component as ammonia gas, aqueous ammonia or liquid ammonia, (3) subjecting the aqueous solution, from which the $NH_3$ component has been recovered and removed, to formation of hydrofluoric acid by a monopolar membrane or a bipolar membrane, after concentrating by conventional electrodialysis or as it is, (4) further recovering a potassium component and/or sodium component in the aqueous solution as potassium hydroxide and/or sodium hydroxide, (5) reusing or recycling the above described recovered ammonia and recovered aqueous hydrofluoric acid solution for preparation of an etching solution and (6) reusing or recycling the above described recovered potassium hydroxide and/or sodium hydroxide for processing the above described waste etching solution.

A waste etching solution discarded from the semiconductor and LSI industries is an aqueous solution consisting of aqueous hydrofluoric acid and ammonium fluoride solutions or containing a fluorine component and ammonia component and also containing a very small amount of impurities (Si, Ca, Mg, Fe, etc.) resulting from an etching operation.

The present invention provides a process for recovering the above described $NH_3$ components and F components as valuable components from such an etching solution, which will hereinafter be illustrated in order:

In the present invention, prior to recovery of $NH_3$ components and F components, it is essential as described below to add a neutralizing agent (alkali) to a waste etching solution to cause chemical reactions and to neutralize HF, $NH_4F$ and metal ions in the waste solution. The alkali used as a neutralizing agent includes preferably potassium hydroxide (KOH) and sodium hydroxide (NaOH). These hydroxides can be used individually or in combination.

When using KOH as a neutralizing agent, it is considered that the following reactions take place:

$$HF + KOH \rightarrow KF + H_2O \quad (1)$$

$$NH_4F + KOH \rightarrow KF + NH_4OH \quad (2)$$

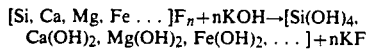
(3)

In the reaction formula (1), HF reacts with KOH to form KF and $H_2O$, in the reaction formula (2), $NH_4F$ reacts with KOH to form KF and $NH_4OH$ and in the reaction formula (3), dissolved metal ions react with KOH to form KF and metal hydroxides.

As is evident from the above described reaction formulas (1), (2) and (3), KF, $NH_4OH$ and the metal hydroxides are formed by the neutralization reaction of the waste etching solution and KOH.

Since impurities in a waste etching solution are present in a very small amount and metal hydroxides are precipitated in a very small amount but cause some troubles in the subsequent processing and recovering steps, it is essential for the present invention to remove the impurities by neutralizing with potassium hydroxide (KOH) and/or sodium hydroxide (NaOH) and filtering, before the susequent processing and recovering steps.

As a filtering means, it is preferable to use an ultraprecision filter medium such as ultrafiltration membrane, whereby ultra-fine particles in the waste solution after the neutralization treatment can completely be removed.

The thus obtained filtrate is an aqueous solution having a composition of $KF$—$NH_4OH$. Thus, for the purpose of separating and recovering the $NH_3$ component from the aqueous solution, it is preferable to employ a method comprising steam heating and thereby evaporating the $NH_3$ component.

In this method, steam is directly bubbled in an aqueous solution containing KF and $NH_4OH$ to evaporate $NH_4OH$ as $NH_3$ gas according to the following scheme:

$$NH_4OH + KF + H_2O \rightarrow (heat) \rightarrow NH_3(gas)\uparrow + KF + H_2O \quad (4)$$

$$NH_3(gas) \rightarrow NH_3(liquid) \quad (5)$$

The $NH_3$ gas evaporated by steaming is stored in a gas holder and then converted into liquid ammonia by means of a liquefying apparatus.

If necessary, the evaporated $NH_3$ gas can be recovered and used as it is or in the form of an aqueous solution after allowing to be absorbed in water, but in the most preferable embodiment of the present invention, the thus recovered ammonia is reused or recycled for the preparation of an etching solution.

In the present invention, the F component is then recovered in the form of a high purity aqueous HF solution by the use of a monopolar membrane or bipolar membrane from the aqueous solution of KF after separating and recovering the $NH_3$ component in the waste etching solution. The use of the bipolar membrane is more preferable than the monopolar membrane.

The ordinary ion exchange membrane is a monopolar membrane which has some fixed positive or negative radicals. The ion exchange membrane having fixed positive radicals is called an anion exchange membrane having a property of selectively allowing to pass only anions, while the ion exchange membrane having fixed negative radicals is called a cation exchange membrane having a proerty of selectively allowing to pass only cations.

Such ion exchange membranes are applied to electrodialysis apparatus, which is a technique having broadly been utilized for concentration of sea water in many salt makers and for desalting of sea water to make drinking water.

The bipolar membrane suitable for the present invention is composed of a pair of a cation ion exchange membrane at one side and an anion ion exchange membrane at another side to be one body, i.e. composed of respectively positively and negatively charged exchange membranes combined adjoining each other.

Referring to FIG. 1, a process for recovering a high purity aqueous HF solution from an aqueous KF solution using this bipolar membrane will now be illustraded.

FIG. 1 shows the principle of the process for recovering a high purity aqueous HF solution utilizing the bipolar membrane. In FIG. 1, water is fed to a chamber 1, chamber 2, chamber 4 and chamber 5, while an aqueous KF solution is fed to chamber 3. As shown in FIG. 1, a cation membrane is arranged at the left side position of the chamber 1, a bipolar membrane is set between the chambers 1 and 2, an anion membrane is set between the Chambers 2 and 3, another cation membrane is set between the chambers 3 and 4, another bipolar membrane is set between the chambers 4 and 5 and at the right position, another anion membrane is arranged.

$F^-$ ion in the aqueous KF solution fed to the chamber 3 is permeated into the chamber 2 through the anion membrane set between the chambers 2 and 3, where $F^-$ ion forms HF with $H^+$ ion through the bipolar membrane between the chambers 1 and 2. On the other hand, similarly, $K^+$ ion in the aqueous KF solution fed to the chamber 3 is moved into the chamber 4 through the cation membrane set between the chambers 3 and 4, where $K^+$ ion forms KOH with $OH^-$ ion moved through the bipolar membrane between the chambers 4 and 5.

HF and KOH are recovered from an aqueous KF solution utilizing a bipolar membrane, as described above. This HF can be reused for the preparation of an etching solution and KOH can be recycled for the neutralization of a waste etching solution.

In the present invention, the reusing or recycling of the recovered HF for the preparation of an etching solution is a preferred embodiment. In particular, when using high purity water such as ion exchange-processed water as $H_2O$ fed to the chambers 1, 2, 4 and 5, the recovered aqueous HF solution is obtained as high purity aqueous hydrofluoric acid solution. Thus, the most preferable embodiment of the present invention consists in using high purity water and reusing or recycling the high purity aqueous hydrofluoric acid solution for the preparation of an etching solution.

At the same time, the reusing or recycling of the recovered KOH as a neutralizing agent of a waste etching solution is also a preferable embodiment of the present invention.

The bipolar membrane is a constitutional element of an electrodialysis apparatus and the operation cost depends on the electric current efficiency thereof. A factor affecting the electric current efficiency is an $NH_3$ component remaining in the aqueous KF solution and when the amount of $NH_3$ component is at most several thousands ppm, the electric current efficiency is about 85 to 85%.

In the present invention, however, metal ions in a waste etching solution are previously removed compltely by a neutralizing treatment and subsequent ultrafiltration and the $NH_3$ component is also separated and recovered to prepare an aqueous HF solution with at most several thousands ppm of the $NH_3$ component, whereby the above described electric current efficiency is not badly affected.

Moreover, in the present invention, it is taken into consideration that the concentration of the aqueous KF is lowered by the steam-heating employed as a means for separating and recovering the $NH_3$ component, but in this case (low concentration), the aqueous HF solution recovered through a bipolar membrane can be subjected again to electrodialysis and concentrated. This is also a preferable embodiment of the present invention.

Figure 2:
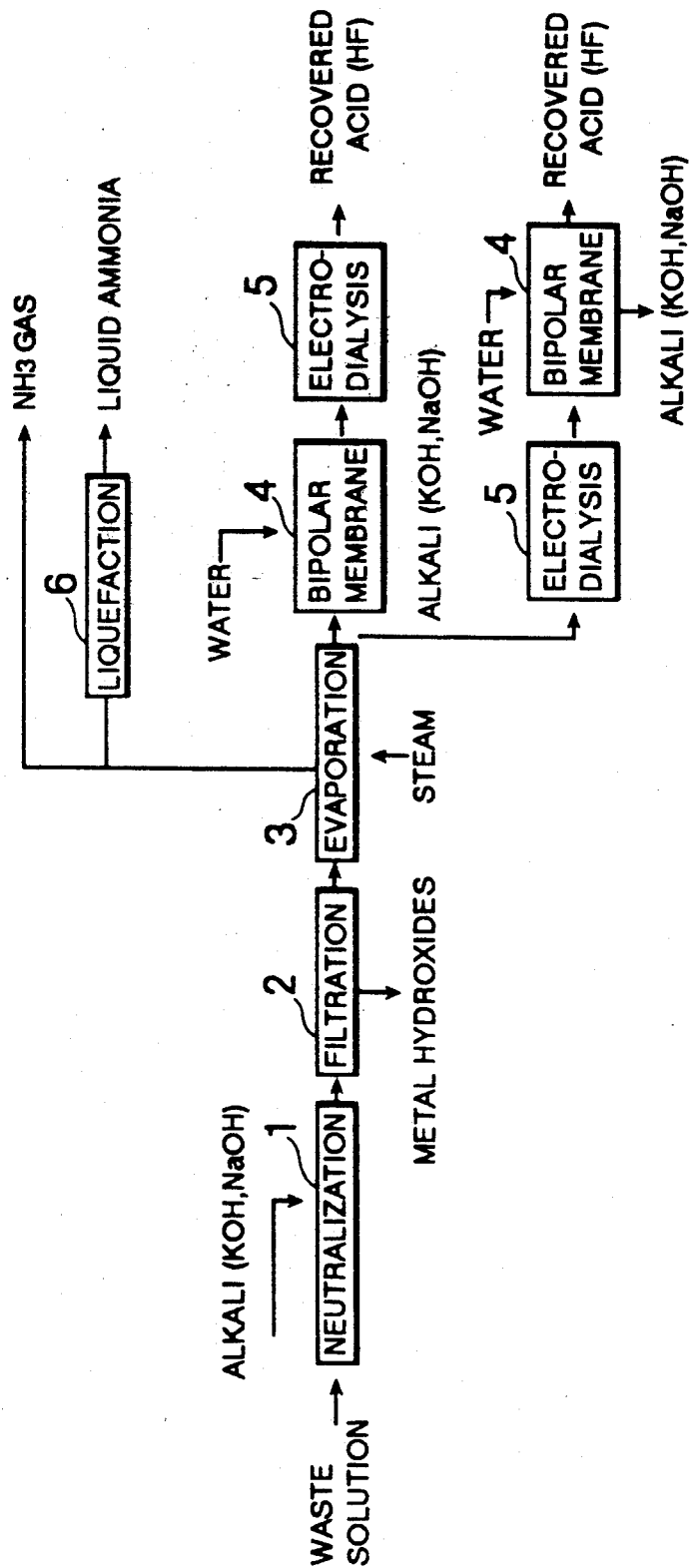
FIG. 2 is a block diagram showing one preferred embodiment of a process for processing a waste etching solution to recover valuables therefrom according to the present invention.

Referring to FIG. 2, the present invention will be illustrated in more detail. FIG. 2 is a flow sheet showing the process order in the processing and recovering process of the present invention.

Firstly, a raw material (waste etching solution containing a fluorine component and ammonia component) is introduced into a neutralizing apparatus 1, where an alkali (KOH. NaOH) is added for neutralization to precipitate metal hydroxides. The solution is then filtered by a filtering apparatus 2 (ultrafiltration device) to remove the metal hydroxides, the filtrate is fed to an $NH_3$ evaporation apparatus 3 where it is subjected to steam-heating to evaporate $NH_3$ and the $NH_3$ gas is recovered as it is or as liquid ammonia through an $NH_3$ liquefying apparatus 6.

The aqueous KF solution, from which the $NH_3$ component has been recovered and removed by the $NH_3$ evaporation apparatus 3, is processed by the following two methods. The first method comprises recovering the recovered acid (HF) or aqueous HF solution through a bipolar membrane 4 by feeding water or ion exchanged water. When the recovered acid (HF) has a low concentration or must be concentrated, it is introduced into an electrodialysis apparatus 5 and concentrated to recover an aqueous HF solution with a high concentration.

The second method comprises introducing the aqueous KF solution into the electrodialysis apparatus 5, where it is previously concentrated, and then recovering an aqueous HF solution with a high concentration through a bipolar membrane 4 by feeding water or ion exchanged water.

The present invention provides a process for recovering valuables from a waste etching solution containing a fluorine component and an ammonia component characterized by the foregoing constructions, capable of bringing about the advantages that an $NH_3$ component in the waste solution can be recovered as amnonia gas, liquid ammonia or aqueous ammonia, an F component can be recovered as an aqueous hydrofluoric acdi solution and an alkali component used as a neutralizing agent can be recovered as an aqueous KOH and/or NaOH solution.

Valuable materials recovered by the present invention can be reused or recycled as a raw material source, resulting in possibility of a closed system or closed circuit comprising preparation of an etching solution and treatment of a waste etching solution, and consequently, there can be provided a means capable of serving to solve problems on source recycling, reduction of discharged materials and environmental pollutions.

The following examples are given in order to illustrate the present invention without limiting the same.

EXAMPLE 1

To an waste etching solution containing a fluorine component and ammonium component ($NH_4F$:373 g/l;

HF:45 g/l; Si: 146 ppm; Ca: <1 ppm) was added an alkali (KOH) in an amount of corresponding to 1.1 equivalent to effect neutralization. The mixture was filtered by an ultra-filtration device and the filtrate was directly evaporated by the use of steam as a heat source to recover an $NH_3$ component. Consequently, the $NH_3$ component in the residual solution was at most 100 ppm. The fluorine concentration in the solution after recovering the $NH_3$ component (after steam heating) measured was 7.8 g/liter.

This solution was then processed by a bipolar membrane to obtain a recovered acid (HF) with a concentration of 7.5 g/liter.

When this solution was treated with an electrodialysis membrane, 14.8 g/liter of a recovered acid (HF) was obtained.

EXAMPLE 2

To an etching waste solution containing a fluorine component and ammonium component ($NH_4F$:344 g/l; HF:40 g/l; Si: 95 ppm; Ca:<1 ppm) was added an alkali (KOH) in an amount of corresponding to 1.1 equivalent to effect neutralization. The mixture was filtered by an ultra-filtration device and the filtrate was directly evaporated by the use of steam as a heat source to recover an $NH_3$ component. The $NH_3$ component in the solution was 350 ppm. The fluorine concentration in the solution after recovering the $NH_3$ component (after steam heating) measured was 14.5 g/liter.

This solution was then processed by a bipolar membrane to obtain a recovered acid (HF) with a concentration of 13.0 g/liter.

When this solution was treated with an electrodialysis membrane, 19.5 g/liter of a recovered acid (HF) was obtained.

EXAMPLE 3

The $NH_3$ and recovered acid (HF) recovered in Examples 1 and 2 was reused or recycled for the preparation of an etching solution.

The alkali (KOH) used as a neutralizing agent was recovered by processing with a bipolar membrane simultaneously with the recovered acid (HF) and the recovered alkali was reused or recycled as a neutralizing agent of a waste etching solution.

According to Example 3, it was rendered possible to carry out the preparation of an etching solution and the processing of a waste etching solution as a closed system or closed circuit.

What is claimed is:

1. A process for processing a waste etching solution containing a fluorine component and an ammonia component to recover hydrogen fluoride, ammonia, ammonium hydroxide, potassium hydroxide and sodium hydroxide therefrom, which comprises adding at least one of potassium hydroxide and sodium hydroxide to the waste etching solution containing a fluorine component and an ammonia component to form hydroxides of metal ions dissolved in the waste solution, filtering the solution and heating the filtrate by steam to recover the generated ammonia as ammonia gas, aqueous ammonia or liquid ammonia, and then subjecting the aqueous solution after recovering the ammonia component to processing using a monopolar or bipolar membrane to recover the fluorine component as an aqueous hydrofluoric acid solution.

2. A process for processing a waste etching solution containing a fluorine component and an ammonia component to recover hydrogen fluoride, ammonia, ammonium hydroxide, potassium hydroxide and sodium hydroxide therefrom, which comprises adding at least one of potassium hydroxide and sodium hydroxide to the waste etching solution containing a fluorine component and an ammonia component to form hydroxides of metal ions dissolved in the waste solution, filtering the solution and heating the filtrate by steam to recover the generated ammonia as ammonia gas, aqueous ammonia or liquid ammonia, and then subjecting the aqueous solution after recovering the ammonia component to processing using a monopolar or bipolar membrane to recover the fluorine component as an aqueous hydrofluoric acid solution, and further recovering at least one of the potassium hydroxide and sodium hydroxide components added to the solution as reactants.

3. A process for processing a waste etching solution containing a fluorine component and an ammonia component to recover hydrogen fluoride, ammonia, ammonium hydroxide, potassium hydroxide and sodium hydroxide therefrom, which comprises adding at least one of potassium hydroxide and sodium hydroxide to the waste etching solution containing a fluorine component and an ammonia component to form hydroxides of metal ions dissolved in the waste solution, filtering the solution and heating the filtrate by steam to recover the generated ammonia as ammonia gas, aqueous ammonia or liquid ammonia, and then subjecting the aqueous solution after recovering the ammonia component to processing using a monopolar or bipolar membrane to recover the fluorine component as an aqueous hydrofluoric acid solution, and further recovering at least one of the potassium hydroxide and sodium hydroxide components added to the solution as reactants and recycling and reusing the recovered ammonia and recovered aqueous hydrofluoric acid solution for the preparation of an etching solution and at least one of the recovered potassium hydroxide and sodium hydroxide for processing the waste etching solution.

4. The process as claimed in any one of claims 1 to 4, wherein the filtering is carried out by the use of an ultrafiltration device.

5. The process as claimed in any one of claims 1 to 4, wherein the heating of the filtrate is carried out by steam-heating.

6. The process as claimed in any one of claims 1 to 4, wherein the aqueous solution after recovering the ammonia component has an $NH_3$ content of at most several thousands ppm.

* * * * *